United States Patent
Kondo

(10) Patent No.: US 8,094,165 B2
(45) Date of Patent: Jan. 10, 2012

(54) COLOR REPRODUCTION EVALUATION APPARATUS AND PROGRAM STORAGE MEDIUM

(75) Inventor: Hirokazu Kondo, Ashigarakami-gun (JP)

(73) Assignee: Fujifilm Corporation, Tokyo (JP)

( * ) Notice: Subject to any disclaimer, the term of this patent is extended or adjusted under 35 U.S.C. 154(b) by 758 days.

(21) Appl. No.: 12/159,333

(22) PCT Filed: Dec. 22, 2006

(86) PCT No.: PCT/JP2006/326304
§ 371 (c)(1),
(2), (4) Date: Jun. 26, 2008

(87) PCT Pub. No.: WO2007/080809
PCT Pub. Date: Jul. 19, 2007

(65) Prior Publication Data
US 2010/0220341 A1    Sep. 2, 2010

(30) Foreign Application Priority Data

Jan. 13, 2006  (JP) .................................. 2006-005563

(51) Int. Cl.
| G09G 5/02 | (2006.01) |
| B41J 2/01 | (2006.01) |
| B41J 2/21 | (2006.01) |
| H04N 1/034 | (2006.01) |
| H04N 1/46 | (2006.01) |
| G06K 1/00 | (2006.01) |
| G06K 9/00 | (2006.01) |
| G06K 9/36 | (2006.01) |

(52) U.S. Cl. ........ 345/589; 345/581; 345/592; 345/600; 345/619; 347/1; 347/3; 347/24; 347/43; 358/1.1; 358/1.9; 358/501; 358/515; 382/162; 382/167; 382/276

(58) Field of Classification Search .......... 345/426–428, 345/581, 589–592, 596–601, 605–606, 619, 345/630; 347/1–3, 24, 43; 358/1.1, 1.9, 358/3.23, 3.24, 500–501, 504–505, 515–519; 382/162–167, 169, 254, 274, 276
See application file for complete search history.

(56) References Cited

U.S. PATENT DOCUMENTS 4,729,016 A * 3/1988 Alkofer ........................ 358/522
(Continued)

FOREIGN PATENT DOCUMENTS
| JP | 2000-067215 A | 3/2000 |
| JP | 2002-247403 A | 8/2002 |
| JP | 3451202 B2 | 7/2003 |
| JP | 3451292 B2 | 7/2003 |

OTHER PUBLICATIONS

Notification of Reasons for Refusal, dated Sep. 21, 2010, issued in corresponding JP Application No. 2006-005563, 7 pages in English and Japanese.

*Primary Examiner* — Wesner Sajous
(74) *Attorney, Agent, or Firm* — Sughrue Mion, PLLC

(57) ABSTRACT

An evaluation apparatus includes an image reproduction section, which obtains a reproduction image by reproducing an original image with a plurality of color elements visually mixed for defining colors, and which obtains a plurality of reproduction images respectively corresponding to twelve types of color element groups having different types of color elements and/or different numbers of color elements from one another. The apparatus also includes a calculation section which calculates a level of a difference between colors of each of the plurality of reproduction images and colors of the original image; and a display section which displays the level of the difference calculated by the difference calculation section.

12 Claims, 6 Drawing Sheets

U.S. PATENT DOCUMENTS

| | | |
|---|---|---|
| 6,188,786 B1 * | 2/2001 | Ueda et al. .................... 382/165 |
| 6,683,981 B1 | 1/2004 | Matama |
| 6,783,202 B2 | 8/2004 | Franzke |
| 2004/0161265 A1 | 8/2004 | Wilcox |
| 2005/0128495 A1 * | 6/2005 | Arai ................................ 358/1.9 |
| 2005/0150411 A1 | 7/2005 | Bestmann |
| 2006/0243415 A1 * | 11/2006 | Holub ........................... 164/130 |
| 2007/0024880 A1 | 2/2007 | Sato et al. |

* cited by examiner

COLOR REPRODUCTION EVALUATION APPARATUS AND PROGRAM STORAGE MEDIUM

TECHNICAL FIELD

The present invention relates to an evaluation apparatus which evaluates color reproduction of a reproduction image obtained by reproducing an original image, and to an evaluation program storage medium storing an evaluation program that causes a computer to operate as the evaluation apparatus.

BACKGROUND ART

Conventionally, inks of color elements of four colors (process colors) of cyan (C), magenta (M), yellow (Y) and black (K) are generally used in a printing machine. Colors are outputted to the surface of a sheet of paper with these color elements visually mixed. In order to output appropriate colors, which cannot be obtained with only the process colors visually mixed, inks of color elements of colors (spot colors) such as red (R), green (G) and blue (B) excluding the process colors may be used.

In printing using such a printing machine or the like, determination on whether or not colors are reproduced by use of spot colors, or determination on which spot colors are good to be used in a case where spot colors are used, is left to a user such as an image editor or a printing company. Certainly, as the number of types of spot colors to be used is increased, the number of types of colors, which can be appropriately reproduced by a printing machine, is increased. Meanwhile, as the number of types of spot colors to be used is increased, the number of operations and costs are increased. For this reason, what is required is to appropriately reproduce colors of an image by use of a printing machine while avoiding using spot colors unnecessarily. However, experiences are required to select a color element group optimal for an image to be printed, from among various color element groups such as a color element group consisting of only the process colors, and a color element group consisting of the process colors and any additional spot color, in comprehensive consideration of color reproduction, labor, costs and the like.

With the circumstances taken into consideration, a technique for obtaining an optimal color element group has been proposed (for instance, refer to Japanese Patent Application Laid-Open Official Gazette No. 2002-247403). In the technique, a skilled user beforehand obtains optimal color element groups for images of various types of contents, and the optimal color element groups for the respective content types are registered in a database. When an image is printed, the content type of the image is inputted, and an optimal color element group for the content type is searched for in the database. Accordingly, the optimal color element group is obtained. For instance, in a case of an image of a content type of an advertisement on fresh food including meat, vegetables and the like, the colors of R and G occupy a larger portion in the image. In the technique disclosed in Japanese Patent Application Laid-Open Official Gazette No. 2002-247403, the color element group, which includes the spot colors of R and G, is automatically obtained for an image of such a content type, not depending on determination by a user.

However, in the technique disclosed in Japanese Patent Application Laid-Open Official Gazette No. 2002-247403, the color element group corresponding to the content type of an image is simply selected. This results in a problem that, even if a different optimal color element would exist among color element groups in a database, a user cannot know the existence. In addition, the technique disclosed in Japanese Patent Application Laid-Open Official Gazette No. 2002-247403 has a problem that a user cannot know how much an adopted color element group is appropriate to an image to be outputted.

DISCLOSURE OF THE INVENTION

In view of the circumstances, an object of the invention is to provide an evaluation apparatus which enables a user to know an optimal color element group, and an evaluation program storage medium storing an evaluation program that causes a computer to operate as the evaluation apparatus.

An evaluation apparatus of the present invention for achieving the object includes: an image reproduction section, which obtains a reproduction image by reproducing an original image with color elements visually mixed for defining colors, and which obtains reproduction images respectively corresponding to color element groups having different types of color elements and/or different numbers of color elements from one another; an evaluation section which evaluates color reproduction for each of the reproduction images; and an evaluation display section which displays a result of the evaluation by the evaluation section.

In the evaluation apparatus of the present invention, for instance, an image to be printed is used as the original image, and reproduction images are obtained by reproducing the original image by use of the color element groups. Thereafter, the color reproduction of the obtained reproduction images is evaluated, and then the result of the evaluation is displayed on the display section. Hence, a user can see the displayed evaluation result to know an optimal color element group for an image to be printed actually.

The evaluation apparatus of the present invention preferably "further includes a selection section which selects one of the color element groups correspondingly to an operation; and an image display section which displays one of the reproduction images correspondingly to the color element group selected by the selection section."

By means of this evaluation apparatus, a user can visually know how each of the color element groups is appropriate for the original image by seeing each of the reproduction images, which is displayed on the image display section.

The evaluation apparatus of the invention also preferably "further includes an image portion specification section which specifies an image portion in the original image, the image portion corresponding to the operation." In this evaluation apparatus, "the image reproduction section obtains reproduction image portions of each of the color element groups by reproducing the image portion specified by the image portion specification section, and the evaluation section evaluates color reproduction for each of the reproduction image portions."

In this evaluation apparatus, the image portion specification section specifies the image portion in the image, the image portion especially requiring accurate color reproduction. Accordingly, the color reproduction can be evaluated efficiently in a way that the evaluation is focused on the image portion.

In addition, in the evaluation apparatus of the invention, typically, "the evaluation section performs the evaluation by obtaining a difference between colors of a corresponding one of the reproduction images and colors of the original image," and "the evaluation section performs the evaluation by obtaining a color difference between colors of each of the reproduction images and colors of the original image."

In the former form, the evaluation is performed by use of an index indicating a difference in color, such as color difference or difference in chroma or hue. In the latter form, the evaluation is performed by use of an especially typical index among the above-indices, that is, the color difference.

In the evaluation apparatus of the invention, preferably, "the evaluation section performs the evaluation by calculating a ratio of an image portion to the original image, the image portion having colors over a range of colors which can be reproduced with the color element group corresponding to each of the reproduction images," and "the evaluation section performs the evaluation by calculating a level of a difference between colors in an original image portion in the original image, and colors in a reproduction image portion in each of the reproduction images, the original image portion having the colors over a range of colors which can be reproduced with the color element group corresponding to each of the reproduction images."

Each of the evaluation apparatuses of those two forms can evaluate how much portion, in which colors of the original image are not perfectly reproduced, exists in a corresponding one of the reproduction image, and how the colors in the portion, in which the colors of the original image are not perfectly reproduced, are different from those of the original color.

In the evaluation apparatus of the invention, preferably, "the evaluation section performs the evaluation by calculating a ratio of an image portion to each of the reproduction images, the image portion having a color difference from the original image, the difference exceeding an allowable level corresponding to an operation," and "the evaluation section performs the evaluation by calculating a statistic value of a level of a difference between colors of an image portion in each of the reproduction images and colors of a corresponding image portion in the original image, the difference exceeding an allowable level corresponding to an operation."

In each of these two forms, more flexible evaluation is possible since the allowable level specification section specifies a desired allowable level. Furthermore, in the former form, it is possible to obtain the evaluation result which a user can easily imagine, that is, the ratio of the image portion to the reproduction image, the image portion having the difference exceeding the specified allowable level. In the latter form, as the evaluation result, the statistic value is obtained such as the average of levels of color differences of the image portion, the difference exceeding the specified allowable level. Accordingly, the user can intuitively grasp the degree of the color reproduction in the reproduced image from such an evaluation result.

In the evaluation apparatus of the invention, preferably, "the image reproduction section obtains the reproduction image by using a color element group including at least four colors of C, M, Y and K out of seven colors of C, M, Y, K, R, G and B as color elements," and "the image reproduction section obtains the reproduction image by using a color element group including at least four colors of C, Y, K and R out of seven colors of C, M, Y, K, R, G and B as color elements."

In each of the two forms, it is possible to perform the evaluation corresponding to the process colors and the spot colors, all of which are used in a generally-used printing machine or the like.

In addition, the evaluation apparatus of the invention preferably "further includes: a cost calculation section which calculates a cost required to output each of the reproduction images to a medium by use of a corresponding one of the color element groups; and a cost display section which displays the cost calculated by the cost calculation section."

The evaluation apparatus in this preferred form can evaluate the color reproduction and the costs necessary for the color reproduction, for each of the corresponding color element groups. Accordingly, it is possible to obtain materials, for instance, for considering the balance between the quality and the costs of print outputs.

An evaluation program storage medium of the present invention for achieving the above object stores an evaluation program, which is incorporated in a computer and causes the computer to implement:

an image reproduction section, which obtains a reproduction image by reproducing an original image with a plurality of color elements visually mixed for defining colors, and which obtains a plurality of reproduction images respectively corresponding to a plurality of color element groups having different types of color elements and/or different numbers of color elements from one another;

an evaluation section which evaluates color reproduction for each of the plurality of reproduction images; and an evaluation display section which displays a result of the evaluation by the evaluation section.

The evaluation program of the present invention causes a computer to configure the above elements of the evaluation apparatus of the present invention.

Here, only the basic structure of the evaluation program of the present invention is described. However, note that this is simply for preventing the redundancy, and the evaluation program of the present invention includes various forms which correspond to the above-described various forms of the above evaluation apparatus in addition to the basic structure.

In addition, an element such as the image reproduction section, which is configured in the computer by use of the evaluation program of the present invention, may be configured by one program component. Alternatively, one element may be configured of program components, or elements may be configured of one program component. In addition, each of the elements may be configured as one which executes such operations by itself. Alternatively, a different program or a program component, which is installed in the computer, may be instructed so that these elements are caused to execute such operations.

As described above, the present invention enables a user to know an optimal color element group.

BEST MODE FOR CARRYING OUT THE INVENTION

Figure 1:
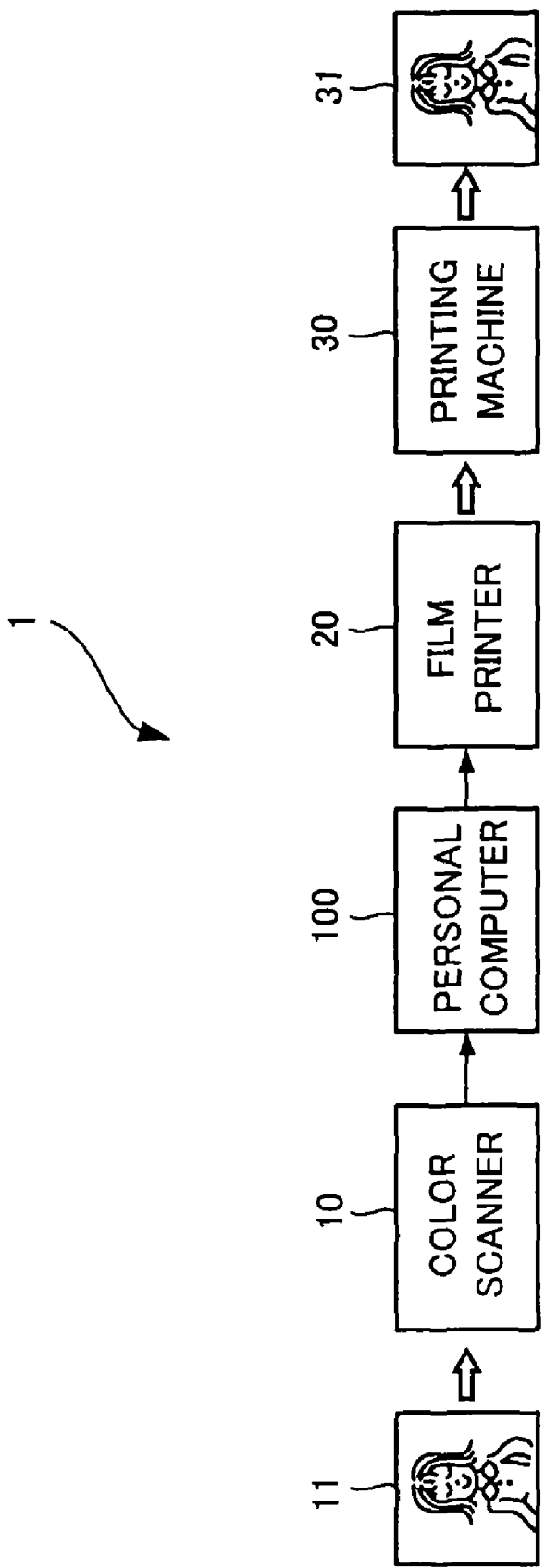
FIG. 1 is an entire configuration diagram of a printing system to which an embodiment of the present invention is applied.

By referring to the drawings, descriptions will be provided below for an embodiment of the present invention.

FIG. 1 is an entire configuration diagram of a printing system to which the embodiment of the present invention is applied.

A printing system 1 illustrated in FIG. 1 includes a printing machine 30 capable of using inks of four process colors of C, M, Y and K and inks of three spot colors of R, G and B. The printing machine 30 prints a print image, which is edited based on an original image 11, on a sheet of paper to produce a print output 31.

A color scanner 10 reads the original image 11, and generates color separation image data of the three colors of R, G and B, which represents the read original image 11. The image data of the colors of R, G and B is inputted to a personal computer 100. By means of the personal computer 100, a user performs electronic assembly based on the inputted image data. Thereafter, image data, which represents a print image, and which is expressed with the three colors of R, G and B, (hereinafter referred to as RGB image data) is generated.

The printing system shown in FIG. 1 can produce the print output 31 with any one of twelve types of color element groups. As described below, the twelve types of color element groups are twelve combinations of seven color elements consisting of the four process colors of C, M, Y and K and the three spot colors of R, G and B.

In the personal computer 100, once the RGB image data is generated as described, sets of an accuracy level and costs for color reproduction are evaluated. The sets corresponding respectively to the cases, in each of which the image (the original image) represented by the RGB image data is reproduced with a corresponding one of the twelve types of color element groups. A method for the evaluation will also be described below together with the twelve types of color element groups.

After the evaluation, the user sees the evaluation result, and then determines a color element group to be adopted for printing.

Once the determination is made, the RGB image data is converted into image data representing an image, which is obtained by reproducing the original image with the colors defined by the adopted color element group. Thereafter, a so-called RIP (Raster Image Processor) converts the converted image data into various versions of dot image data, which respectively represent dot images each composed of dots. The conversion is performed on each of the color elements constituting the color element group. Hence, the various versions of dot image data, which respectively correspond to the color elements, are produced.

The various versions of print dot image data are inputted to a film printer 20. The film printer 20 produces print film originals corresponding to the respective inputted versions of the dot image data. Plates of the respective versions are produced from the print film originals, and then the plates are installed in the printing machine 30. Thereafter, inks of the colors corresponding respectively to the versions are applied to the corresponding plates, and the applied inks are transferred to a sheet of print paper. Once the inks of the respective versions are transferred, the print output 31 is formed.

Figure 2:
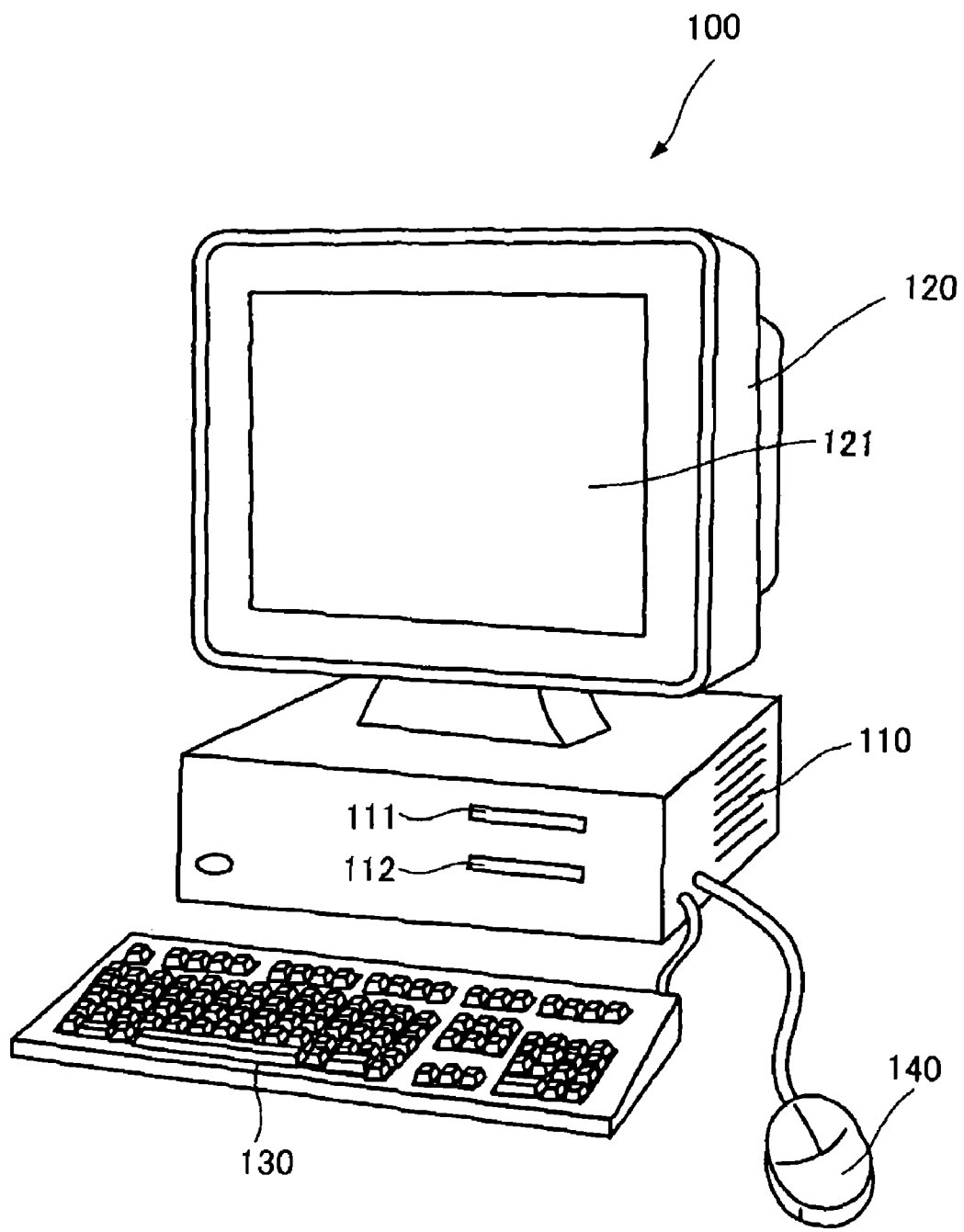
FIG. 2 is an external perspective view of a personal computer 100 of FIG. 1.
Figure 3:
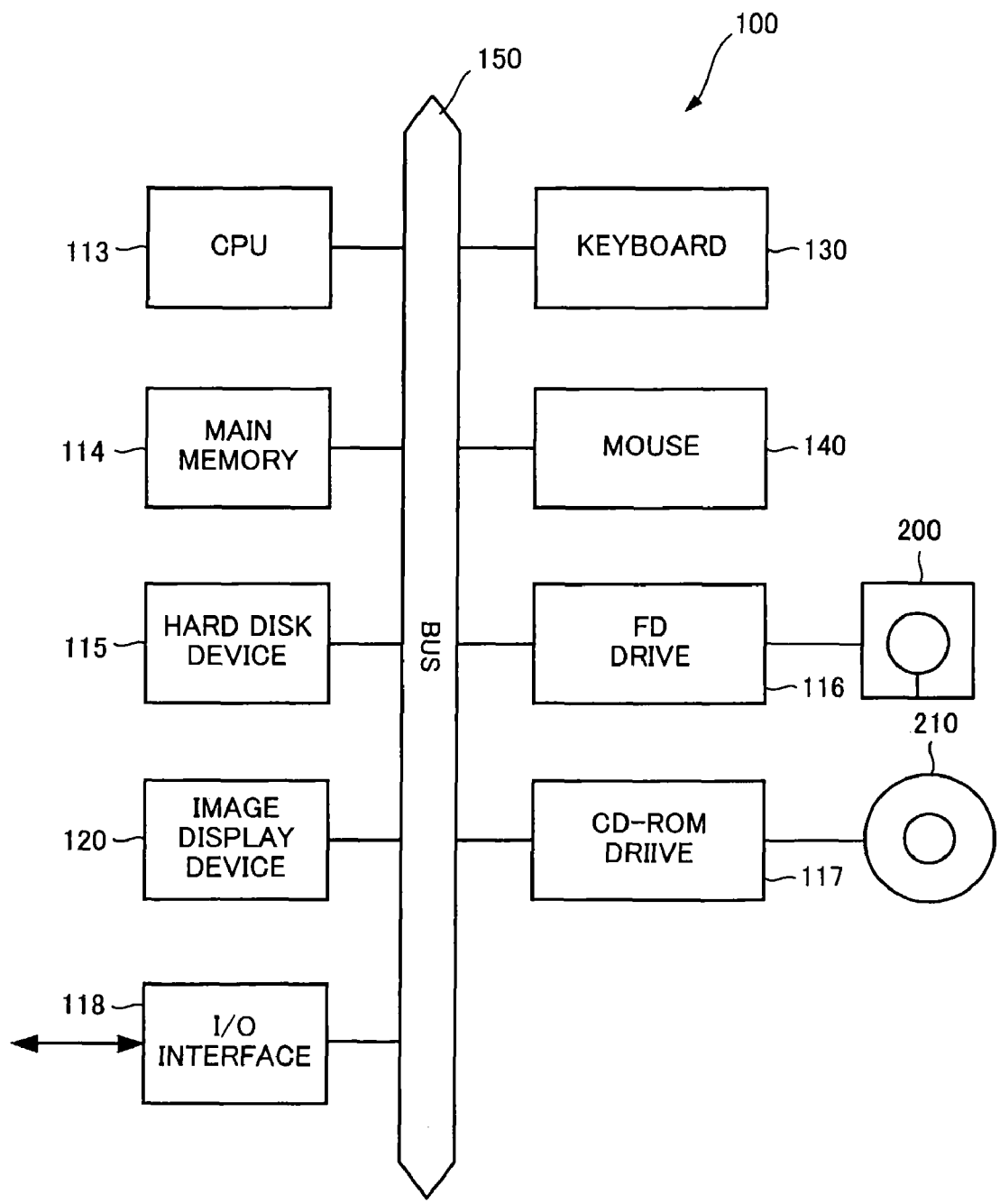
FIG. 3 is a diagram of a hardware configuration of the personal computer 100 of FIG. 1.

FIG. 2 is an external perspective view of the personal computer 100 of FIG. 1. FIG. 3 is a view of a hardware configuration of the personal computer 100.

From the viewpoint of the external configuration, the personal computer 100 includes: a main device 110; an image display device 120 having a display screen on which an image is displayed in accordance with an instruction from the main device 110; a keyboard 130 used to input various types of information to the main device 110 in accordance with key operations; and a mouse 140 used to specify an arbitrary position on the display screen 121 in order to, for instance, input an instruction corresponding to an icon displayed on the position. From its appearance, the main device 110 includes: an FD insertion slot 111 used to insert a flexible disk (abbreviated as FD below); and a CD-ROM insertion slot 112 used to insert a CD-ROM.

As shown in FIG. 3, the following are incorporated into the main device 110: a CPU 113 which executes various programs; a main memory 114 to which a program stored in a hard disk device 115 is read, and in which the read program is expanded to be executed by the CPU 113; the hard disk device 115 in which various programs and data are saved; an FD drive 116 which accesses the FD 200; a CD-ROM drive 117 to which a CD-ROM 210 is inserted, and which accesses the inserted CD-ROM 210; and an I/O interface 118 which is connected to the color scanner 10 and the film printer 20 of FIG. 1, and which sends and receives data to and from these devices. These various elements are connected to the image display device 120, the keyboard 130 and the mouse 140, which are also shown in FIG. 2, via a bus 150.

As described above, the personal computer 100 generates the RGB image data, evaluates the color element groups, and produces the dot image data. Since the generation of the RGB data and the production of the dot image data in the processing is not the point of the present invention, detailed descriptions of the generation and the production will be omitted. Hereafter, descriptions will be provided focusing on evaluation on the color element groups by the personal computer 100.

In this embodiment, an evaluation program is stored in the CD-ROM 210 shown in FIG. 3. The evaluation program causes the personal computer 100 to operate as the embodiment of an evaluation apparatus of the present invention, which evaluates the color element groups. Once the CD-ROM 210 is inserted into the CD-ROM drive 117, the program stored in the CD-ROM 210 is uploaded to the personal computer 100, and then is written into the hard disk device 115. Accordingly, the personal computer 100 operates as the evaluation apparatus.

Descriptions will be provided below for an embodiment of the evaluation program storage medium of the present invention.

Figure 4:
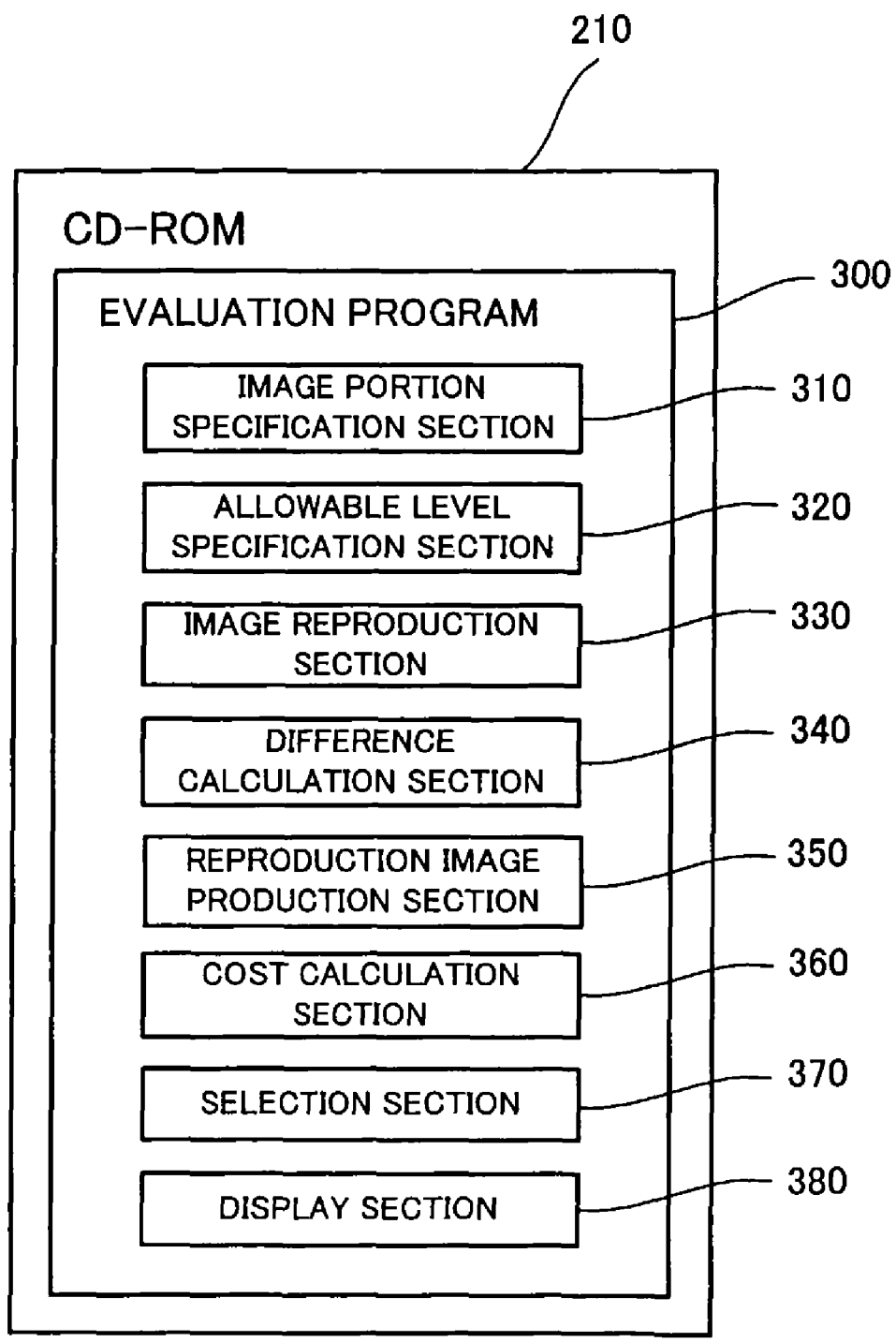
FIG. 4 is a schematic diagram showing an evaluation program stored in an embodiment of the evaluation program storage medium of the present invention.

FIG. 4 is a schematic diagram showing an evaluation program stored in the embodiment of the evaluation program storage medium of the present invention.

FIG. 4 schematically shows the CD-ROM 210 in which an evaluation program 300 is stored.

The evaluation program 300 causes the computer 100 to operate as the embodiment of the evaluation apparatus of the present invention, and includes: an image portion specification section 310; an allowable level specification section 320; an image reproduction section 330; a difference calculation section 340; a reproduction image production section 350; a cost calculation section 360; a selection section 370; and a display section 380. Detailed descriptions will be provided below for each of the elements of the evaluation program 300.

Figure 5:
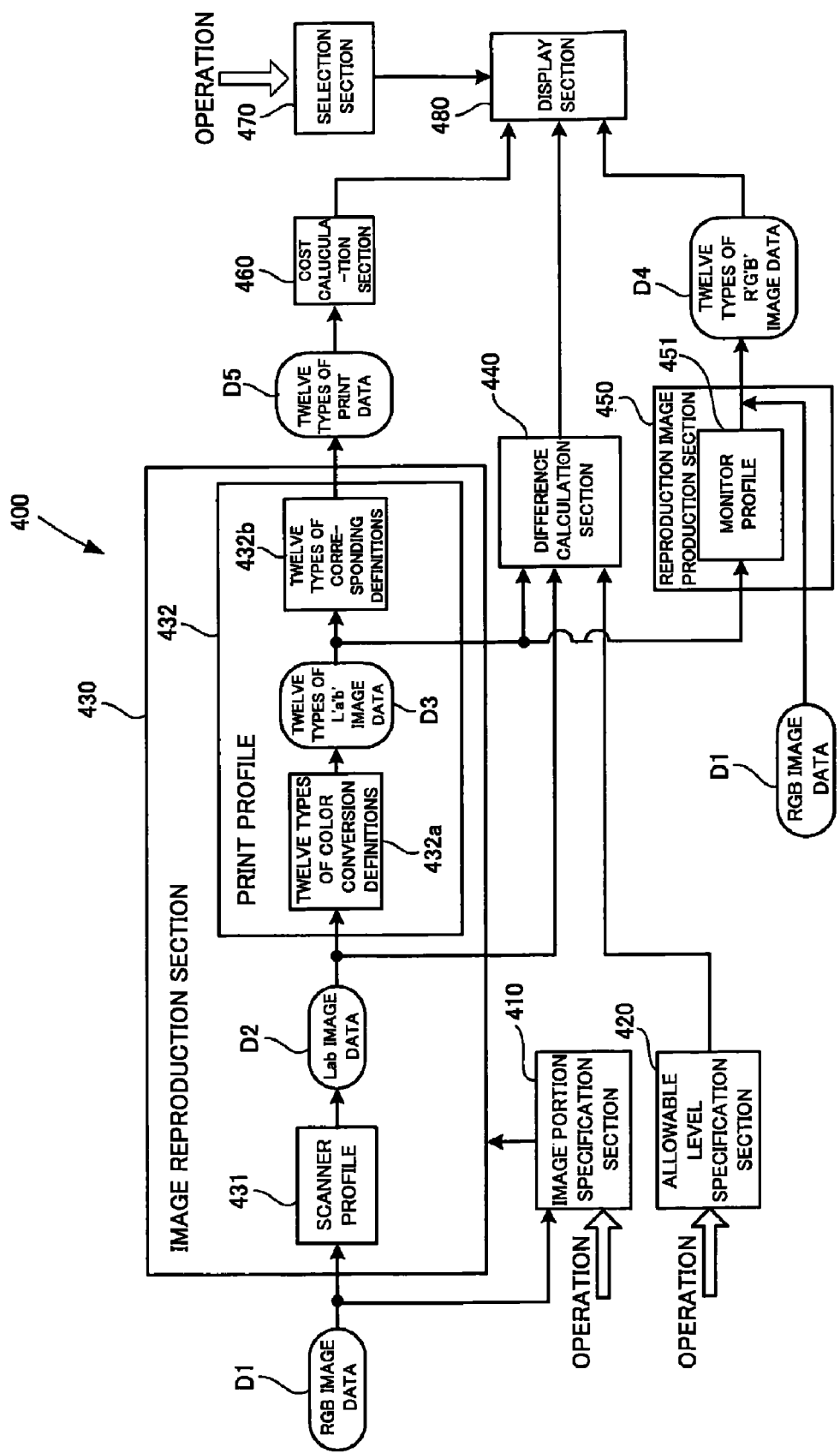
FIG. 5 is a block diagram of an embodiment of the evaluation apparatus of the present invention.

FIG. 5 is a block diagram showing the embodiment of the evaluation apparatus of the present invention.

An evaluation apparatus 400 of the embodiment of the evaluation apparatus of the present invention is configured by installing the evaluation program 300 of FIG. 4 in the computer 100 of FIG. 1, and then by executing the program. The evaluation apparatus 400 includes: an image portion specification section 410; an allowable level specification section 420; an image reproduction section 430; a difference calculation section 440; a reproduction image production section 450; a cost calculation section 460; a selection section 470; and a display section 480.

Once the evaluation program 300 of FIG. 4 is installed into the computer 100 of FIG. 1, the image portion specification section 310, the allowable level specification section 320, the image reproduction section 330, the difference calculation section 340, the reproduction image production section 350, the cost calculation section 360, the selection section 370, and the display section 380, all of which are included in the evaluation program 300, configure respectively the image portion specification section 410, the allowable level specification section 420, the image reproduction section 430, the difference calculation section 440, the reproduction image production section 450, the cost calculation section 460, the selection section 470, and the display section 480, all of which are included in the evaluation apparatus 400 shown in FIG. 5. These elements of the evaluation apparatus 400 are configured of the combination of hardware of the computer and an OS as well as the application program, the OS and the application program being executed by the computer. Meanwhile, the elements of the evaluation program 300 of FIG. 4 are configured of only the application program.

The image portion specification section 410, the image reproduction section 430, the difference calculation section 440, the cost calculation section 460, and the selection section 470, all of which are included in the evaluation apparatus 400, correspond respectively to examples of an image portion specification section, an image reproduction section, an evaluation section, a cost calculation section, and a selection section, all of which are included in the evaluation apparatus of the present invention. In addition, the display section 480 corresponds to an example of a combination of an evaluation display section, an image display section and a cost display section, all of which are included in the evaluation apparatus of the present invention.

Descriptions will be provided below for the elements of the evaluation apparatus 400 shown in FIG. 5 in a way that the elements of the evaluation program 300 shown in FIG. 4 are described as well.

The evaluation apparatus 400 evaluates sets of an accuracy level and costs for color reproduction. The sets respectively correspond to the cases, in each of which an original image represented by RGB image data D1 is reproduced with a corresponding one of twelve types of color element groups. The twelve types of color element groups are twelve combinations of color elements of the four process colors of C, M, Y and K and the three spot colors of R, G and B.

As described below, the display section 480 of the evaluation apparatus 400 has a function of displaying the result of evaluation on the color element groups on the display screen 121. In an initial state before the evaluation, the display section 480 also has a function of first displaying an original image on the display screen 121 based on the RGB image data D1 while being.

Figure 6:
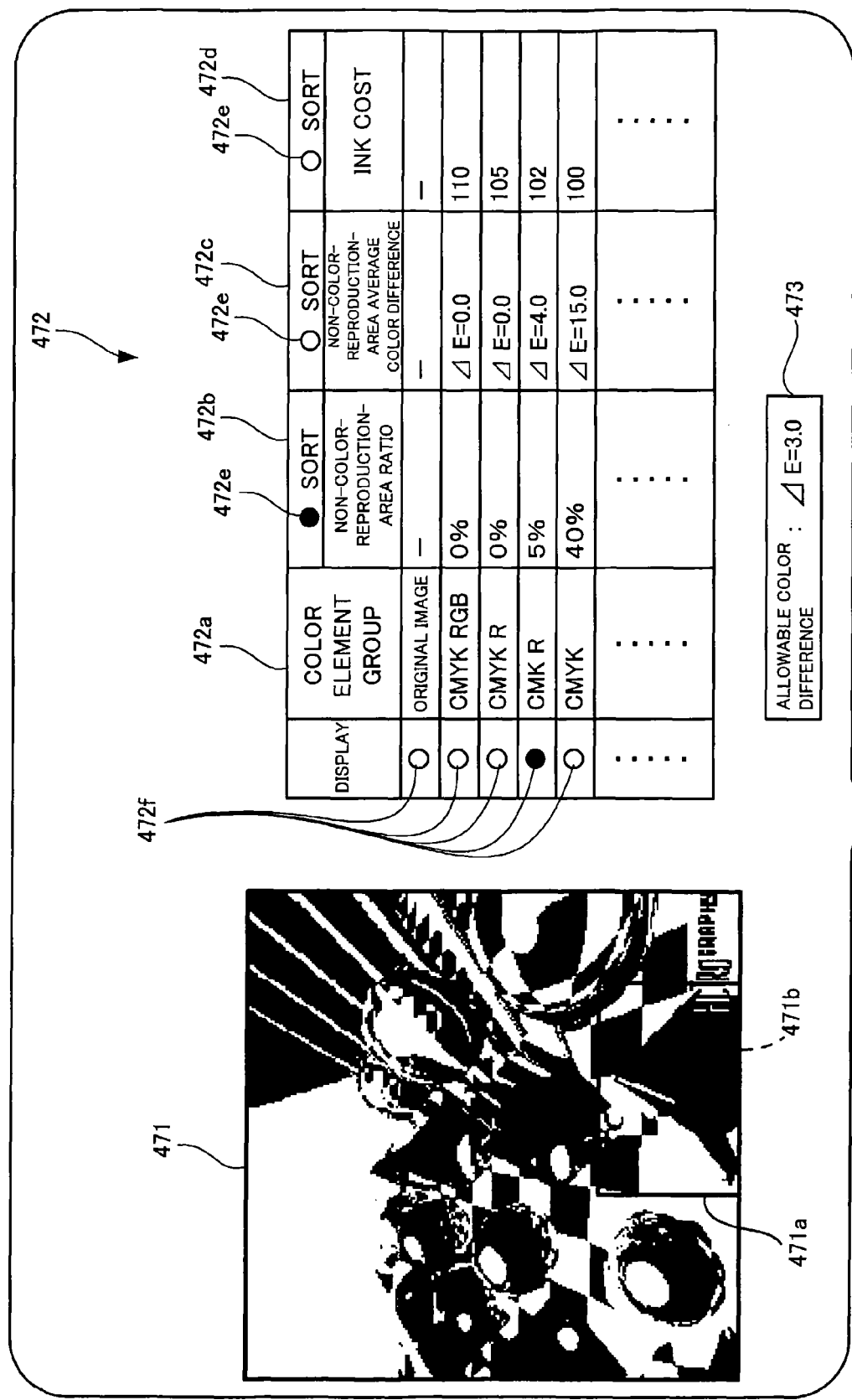
FIG. 6 is a view showing an example of contents displayed by a display section 480.

FIG. 6 is a view showing an example of contents of the displaying by the display section 480.

As shown in FIG. 6, the display section 480 displays a screen consisting of: an image display portion 471; an evaluation result display portion 472; and an allowable color difference display portion 473. While in an initial state before the evaluation, the evaluation result display portion 472 and the allowable color difference display portion 473 are displayed without any content, and the image displayed portion 471 is displayed in a state where the original image is displayed.

Via the image display portion 471 and the allowable color difference display portion 473 in such an initial state, operations for setting evaluation conditions are performed as follows.

First, the image portion specification section 410 of FIG. 5 causes a quadrate line image 471a in the original image to be displayed in the image display portion 471. In this embodiment, the quadrate line image 471a is moved and modified by a mouse operation to set an image portion (the inside of the line image 471a) for which a reproduced color is evaluated. The set image portion is recognized by the image portion specification section 410 of FIG. 5, and then, the image portion specification section 410 informs the image reproduction section 430 of the image portion.

As described below, the accuracy level of color reproduction is evaluated based on color difference between the original image and each of the reproduction images. The allowable specification section 420 of FIG. 5 obtains an allowable level of the color difference (allowable color difference), which is inputted as a numerical value via the allowable color difference display portion 473 in the initial state. Thereafter, the obtained allowable color difference is sent to the difference calculation section 440.

The image reproduction section 430 of FIG. 5 obtains reproduction images, each of which is obtained in a case where the original image is reproduced with a corresponding one of the twelve types of color element groups. Note that each of the reproduction images is obtained for the image portion sent from the image portion specification section 410.

The image reproduction section 430 includes a scanner profile 431 which defines the relationship between an RGB color space depending on the color scanner 10 of FIG. 1 and a device-independent Lab color space. By use of the scanner profile 431, image data, which corresponds to the image portion specified by the image portion specification section 410, in the RGB image data D1 representing the original image, is converted into Lab image data D2 representing the image portion.

The image reproduction section 430 includes twelve types of print profiles 432 on the printing machine 30 of FIG. 1. The print profiles 432 define relationships each between the Lab color space and a corresponding one of the following twelve types of color element groups.

Descriptions will be provided for the twelve types of color element groups.

These twelve types of color element groups correspond respectively to the following twelve combinations of the four process colors of C, M, Y and K and the three spot colors of R, G and B. Specifically, the twelve types of the color element groups include: a color element group of the four colors of C, M, Y and K only; a color element group of the four colors of C, M, Y and K and the color of R; a color element group of the four colors of C, M, Y and K and the color of G; a color element group of the four colors of C, M, Y and K and the color of B; a color element group of the four colors of C, M, Y and K and the two colors of R and G; a color element group of the four colors of C, M, Y and K and the two colors of G and B; a color element group of the four colors of C, M, Y and K and the two colors of B and R; a color element group of the four colors of C, M, Y and K and the three colors of R, G and B; a color element group of the three colors of C, Y and K and the color of R; a color element group of the three colors of C, Y and K and the two colors of R and G; a color element group of the three colors of C, Y and K and the two colors of B and R; and a color element group of the three colors of C, Y and K and the three colors of R, B and G.

Basically, each of the twelve types of print profiles 432 defines the relationship of colors equivalent between the Lab color space and a color space corresponding to one of the color element groups. The print profiles 432 are used to redefine the colors of the image portion of the image, which is read by the color scanner 10 of FIG. 1, with the color spaces corresponding respectively to the color element groups.

Each of the color element groups has a predetermined range of colors which can be reproduced with the color element group. The range of colors, which the color scanner 10 of FIG. 1 can use, is predetermined as well. Furthermore, the range of colors which the color scanner 10 can use is wider than the ranges of colors which can be reproduced with the color element groups. For this reason, there is a high possibility that some colors defined in the Lab image data D2 are not in the range of colors which can be reproduced with the color element groups. Thus, it is difficult to redefine the colors to realize the completely same colors in the color space corresponding to one of the color element groups.

With consideration of the difficulty, in this embodiment, color conversion is performed before the colors are redefined in the color space corresponding to one of the color element groups. In the color conversion, a color over the range of colors which can be reproduced with the color element group is converted into a color in the range, which is as close as possible to the color over the range. In addition, when the color over the range is converted into one in this color conversion, colors around the converted color are automatically adjusted to prevent a failure, such as unnatural colors around the converted color which do not match the converted color.

The twelve types of print profiles 432 respectively include color conversion definitions 432a, each of which defines such color conversion. Based on the color conversion definitions 432a corresponding respectively to the color element groups, the Lab image data D2 is converted into twelve types of L' a' b' image data D3.

Once the reproduction images, which respectively correspond to the twelve types of the color element groups, are obtained in a form of the twelve types of L' a' b' image data D3, the difference calculation section 440 obtains the twelve types of the L' a' b' image data D3 and the Lab image data D2. As described, the Lab image data D2 represents the image portion of the original data, the image portion being specified by the image portion specification section 410. Each of the twelve types of the L' a' b' image data D3 is obtained by reproducing the image portion with the corresponding one of the color element groups.

The difference calculation section 440 first calculates the color difference between the image portion of the original image and each of the reproduction images on a pixel basis. As described above, the allowable color difference, which is obtained by the allowable level specification section 420, has been sent to the difference calculation section 440. The difference calculation section 440 compares the color difference, which is calculated on a pixel basis, with the allowable color difference. Thereafter, the difference calculation section 440 calculates a ratio of pixels, which correspond to color difference levels exceeding the allowable color difference, to the image portion (non-color-reproduction-area ratio), for each of the twelve types of reproduction images. The difference calculation section 440 also calculates an average of the color difference levels exceeding the level of the allowable color difference in the image portion (non-color-reproduction-area average color difference) for each of the twelve types of the reproduction images.

The color of a pixel, which corresponds to the color difference level exceeding the allowable color difference, can be regarded as a color over the range of colors which can be reproduced with the corresponding one of the color element groups.

The color difference calculation section 440 passes, to the display section 480, the non-color-reproduction-area ratios and the non-color-reproduction-area average color difference, both of which are used for indicating the reproduction accuracy of each of the color element groups.

In addition, the reproduction image production section 450 also obtains the twelve types of L' a' b' image data D3. The reproduction image production section 450 includes a monitor profile 451 which defines a corresponding relationship between an RGB space depending on the image display device 120 (refer to FIG. 2) and a device-independent Lab color space. By means of the monitor profile 451, the twelve types of L' a' b' image data D3 are respectively converted into twelve types of RGB data. Furthermore, the reproduction image production section 450 obtains the RGB image data D1 representing the original image, and then combines the RGB data D1 and each of the twelve types of RGB data which are obtained by the above conversion. Accordingly, R' G' B' image data D4 are produced. The R' G' B image data represent the twelve respective display images in each of which the image portion of the original image has been replaced. The produced twelve types of R' G' B' image data D4 are passed to the display section 480 as well.

The twelve types of print profiles 432 in the image reproduction section 430 respectively include corresponding definitions 432b, each of which defines a corresponding relationship between a Lab color space and a color space (for instance, CMYK color space, CMYKR color space or the like) using the color elements constituting the corresponding one of the color element groups as coordinate axes. In the image reproduction section 430, the twelve-types of L' a' b' image data D3 are respectively converted (only the image portions are converted) into twelve types of image data D5 by means of the corresponding definitions 432b. The twelve types of image data D5 obtained by the conversion are passed to the cost calculation section 460.

The cost calculation section 460 calculates twelve types of ink costs of the image portions respectively based on the obtained twelve types of image data 5 as follows:

First, the cost calculation section 460 calculates ratios (area ratio) of the images of the respective colors of C, M, Y, K, R, G and B in the image portion, for each of the twelve types of image data D5. Thereafter, based on the area ratios of the images of the respective colors of C, M, Y, K, R, G and B in the image portion, the costs of inks to be used for the image portion are calculated according to the following equation.

Ink cost=(C area ratio×C ink unit cost+M area ratio×M ink unit cost+Y area ratio×Y ink unit cost+K area ratio×K ink unit cost+R are ratio×R ink unit cost+G area ratio×G ink unit cost+B area ratio×B ink unit cost)×number of print sets Furthermore, a relative value of each of the twelve types of the ink costs to the value "100," which represents the ink costs in a case of using only the four process colors C, M, Y and K, is calculated as the ink costs. The cost calculation section 460 passes the twelve types of ink costs to the display section 480.

In the evaluation result display portion 472 shown in FIG. 6, the display section 480 first describes and displays the non-color-reproduction-area ratios and the non-color-reproduction-area average color differences, all of which have been passed as reproduction accuracy levels for the respective twelve types of color element groups from the difference calculation section 440, and the ink costs of the respective twelve types of color element groups, which have been passed from the cost calculation section 460.

As shown in FIG. 6, the evaluation result display portion 472 includes: the condition display portion 472a in which the twelve types of color element groups are described; an area ratio display portion 472b in which the non-color-reproduction-area ratios of the respective color element groups are described; a color difference display portion 472c in which the non-color-reproduction-area average color differences of the respective color element groups are described; and a cost display section 472d in which the ink costs of the respective color elements are described. The values passed from the difference calculation section 440 and the cost calculation section 460 are described in the corresponding portions. Each of the area ratio display portion 472b, the color difference display portion 472c, and the cost display section 472d has a sort specification button 472e. Once any one of the three sort specification buttons is clicked, the values of the display portion corresponding to the clicked sort specification button 472e are sorted in an ascending order. Following the sorting, the contents of other description portions in the evaluation result display portion 472 are sorted in accordance with the sorting as well. The example of FIG. 6 shows the state where the sort specification button 472e of the area ratio display portion 472b is clicked so that the non-color-reproduction-area ratios are sorted.

The display section 480 displays the images respectively represented by the twelve types of R' G' B' data D4, which have been passed from the reproduction image production section 450, in the image display portion 471 in which the original image represented by the RGB image data D1 has been displayed in the initial state before the evaluation. The displaying is performed as follows.

In the evaluation result display portion 472, display specification buttons 472f for specifying the displaying of the reproduction images in the image display portion 471 are provided for the respective color element groups.

Once the user clicks any one of the display specification buttons 472f, which corresponds to a desired color element group, the selection section 470 shown in FIG. 5 selects the color element group of the clicked display specification button 472f, and then passes the selection result to the display section 480. Thereafter, the display section 480 displays the display image corresponding to the selection result on the image display portion 471.

In addition, in the image display portion 471, the quadrate line image 471a, which is used to specify an image portion for the evaluation, is left without change for indicating the portion of the reproduction image. In the image display portion 471, a dotted line image 471b, which indicates a region of pixels corresponding to the color difference exceeding the allowable color difference, is displayed as well. In addition, one of the display specification buttons 472f is prepared for the original image which is displayed in the initial state. Once this display specification button 472f is clicked, the original image is displayed in the image display portion 471 as in the case of the initial state.

In this embodiment, the user determines one of the color element groups, which is to be adopted for printing, by seeing the non-color-reproduction-area ratios, the non-color-reproduction-area average color differences, and the ink costs, all of which are displayed on the evaluation result display portion 472, and by seeing the reproduction images each displayed on the image display portion 471. For instance, in a case where reproduction of colors in a larger range is desired, the user adopts the color element group, which has the smallest non-color-reproduction-area ratio, for printing. In a case where the accurate reproduction of colors is desired, the user adopts the color element group, which has the smallest non-color-reproduction-area average color difference, for printing. In a case where cost reduction is prioritized over the accuracy in color reproduction, the user adopts the color element group, which requires the lowest ink cost, for printing. As described, by means of the evaluation apparatus 400 of the embodiment (refer to FIG. 5), the user can know which color element group is optimal depending on the circumstances of printing. In addition, it is possible to confirm the colors reproduced with the adopted color element group by means of the reproduction image displayed on the image display portion 471.

In the above descriptions, the image reproduction section 430, which defines colors with any one of the twelve types of color element groups consisting of twelve combinations of the four process colors of C, M, Y and K and the three spot colors of R, G and B, is described as an example of the image reproduction section of the present invention. However, note that the present invention is not limited to this. For instance, the image reproduction section of the present invention may define colors with any one of the smaller and larger number of types of color element groups than the twelve types. Alternatively, the image reproduction section of the present invention may define colors with colors other than C, M, Y, K, R, G and B.

In addition, in the above descriptions, the difference calculation section 440, which calculates the non-color-reproduction-area ratios and the non-color-reproduction-area average color differences, is described as an example of the difference calculation section of the present invention. However, the present invention is not limited to this. The difference calculation section of the present invention may calculate difference in chromas and hues within a specified range.

In addition, in the above descriptions, the difference calculation section 440, which obtains color differences in the Lab color space, is described as an example of the difference calculation section of the present invention. However, the present invention is not limited to this. For instance, the difference calculation section of the present invention may obtain the color difference in an XYZ color space.

What is claimed is:

1. An evaluation apparatus comprising:
an image reproduction section, which obtains a reproduction image by reproducing an original image with a plurality of color elements visually mixed for defining colors, and which obtains a plurality of reproduction images respectively corresponding to a plurality of color element groups having different types of color elements and/or different numbers of color elements from one another;
an evaluation section which evaluates color reproduction for each of the plurality of reproduction images;
an evaluation display section which displays a result of the evaluation by the evaluation section; and
an image portion specification section which specifies an image portion in the original image, the image portion corresponding to the operation, wherein
the image reproduction section obtains a plurality of reproduction image portions of each of the plurality of color element groups by reproducing the image portion specified by the image portion specification section, and
the evaluation section evaluates color reproduction for each of the plurality of reproduction image portions.

2. The evaluation apparatus according to claim 1, further comprising:
 a selection section which selects one of the plurality of color element groups correspondingly to an operation; and
 an image display section which displays one of the reproduction images correspondingly to the color element group selected by the selection section.

3. The evaluation apparatus according to claim 1, wherein the evaluation section performs the evaluation by obtaining a difference between colors of a corresponding one of the reproduction images and colors of the original image.

4. The evaluation apparatus according to claim 1, wherein the evaluation section performs the evaluation by obtaining a color difference between colors of each of the reproduction images and colors of the original image.

5. The evaluation apparatus according to claim 1, wherein the evaluation section performs the evaluation by calculating a ratio of an image portion to the original image, the image portion having colors over a range of colors which can be reproduced with the color element group corresponding to each of the reproduction images.

6. The evaluation apparatus according to claim 1, wherein the evaluation section performs the evaluation by calculating a level of a difference between colors in an original image portion in the original image, and colors in a reproduction image portion in each of the reproduction images, the original image portion having the colors over a range of colors which can be reproduced with the color element group corresponding to each of the reproduction images.

7. The evaluation apparatus according to claim 1, wherein the evaluation section performs the evaluation by calculating a ratio of an image portion to each of the reproduction images, the image portion having a color difference from the original image, the difference exceeding an allowable level corresponding to an operation.

8. The evaluation apparatus according to claim 1, wherein the evaluation section performs the evaluation by calculating a statistic value of a level of a difference between colors of an image portion in each of the reproduction images and colors of a corresponding image portion in the original image, the difference exceeding an allowable level corresponding to an operation.

9. The evaluation apparatus according to claim 1, wherein the image reproduction section obtains the reproduction image by using a color element group including at least four colors of C, M, Y and K out of seven colors of C, M, Y, K, R, G and B as color elements.

10. The evaluation apparatus according to claim 1, wherein the image reproduction section obtains the reproduction image by using a color element group including at least four colors of C, Y, K and R out of seven colors of C, M, Y, K, R, G and B as color elements.

11. The evaluation apparatus according to claim 1, further comprising:
 a cost calculation section which calculates a cost required to output each of the plurality of the reproduction images to a medium by use of a corresponding one of the plurality of the color element groups; and
 a cost display section which displays the cost calculated by the cost calculation section.

12. A non-transitory computer-readable medium that stores an evaluation program incorporated in a computer, causing the computer to operate as an evaluation apparatus, the evaluation apparatus comprising:
 an image reproduction means for, obtaining a reproduction image by reproducing an original image with a plurality of color elements visually mixed for defining colors, and obtaining a plurality of reproduction images respectively corresponding to a plurality of color element groups having different types of color elements and/or different numbers of color elements from one another;
 an evaluation means for evaluating color reproduction for each of the plurality of reproduction images;
 an evaluation display means for displaying a result of the evaluation by the evaluation section; and
 an image portion specification means for specifying an image portion in the original image, the image portion corresponding to the operation, wherein
 the image reproduction means obtains a plurality of reproduction image portions of each of the plurality of color element groups by reproducing the image portion specified by the image portion specification means, and
 the evaluation means evaluates color reproduction for each of the plurality of reproduction image portions.

\* \* \* \* \*